United States Patent [19]
Yano

[11] Patent Number: 5,648,829
[45] Date of Patent: Jul. 15, 1997

[54] METHOD FOR FABRICATING A LIQUID CRYSTAL DISPLAY INCLUDING IRRADIATING AN ALIGNMENT FILM WITH UV LIGHT

[75] Inventor: Wataru Yano, Yohkaichi, Japan

[73] Assignee: Kyocera Corporation, Kyoto, Japan

[21] Appl. No.: 384,128

[22] Filed: Feb. 3, 1995

[30] Foreign Application Priority Data

Feb. 15, 1994 [JP] Japan ................................ 6-018083

[51] Int. Cl.⁶ .......................... G02F 1/1337; G02F 1/141
[52] U.S. Cl. ............................................. 349/129; 349/136
[58] Field of Search ............................. 359/75, 76

[56] References Cited

U.S. PATENT DOCUMENTS

| | | | |
|---|---|---|---|
| 4,328,493 | 5/1982 | Shanks et al. | 359/43 |
| 5,446,569 | 8/1995 | Iwai et al. | 359/78 |
| 5,464,669 | 11/1995 | Kang et al. | 359/76 |
| 5,473,455 | 12/1995 | Koike et al. | 359/76 |
| 5,478,682 | 12/1995 | Nishikawa et al. | 359/76 |

FOREIGN PATENT DOCUMENTS 5-5886   1/1993   Japan .

Primary Examiner—William L. Sikes
Assistant Examiner—Charles Miller
Attorney, Agent, or Firm—Loeb & Loeb LLP

[57] ABSTRACT

A liquid crystal display device and a method for fabricating the same are provided. In fabricating a liquid crystal display device, the method enables liquid crystal alignment operation to be easily and accurately carried out in such a way that liquid crystal alignment is changed between adjacent minute regions. An alignment film is formed on a glass substrate formed with transparent electrodes, and then rubbing operation is performed using a rubbing cloth in one direction with respect to the alignment film, so that the alignment film is caused to maintain a high pretilt condition. After a mask substrate is so positioned as to register with the glass substrate, ultraviolet light irradiation is effected to form a high-pretilt keeping region and a low-pretilt keeping region on the surface of the alignment film. In the display device, it is arranged that one high-pretilt keeping region is disposed opposite one low-pretilt keeping region. Use of ultraviolet light in forming the high-pretilt keeping and low-pretilt keeping regions provides for good simplicity in the fabricating process involved.

2 Claims, 8 Drawing Sheets

FIG. 1
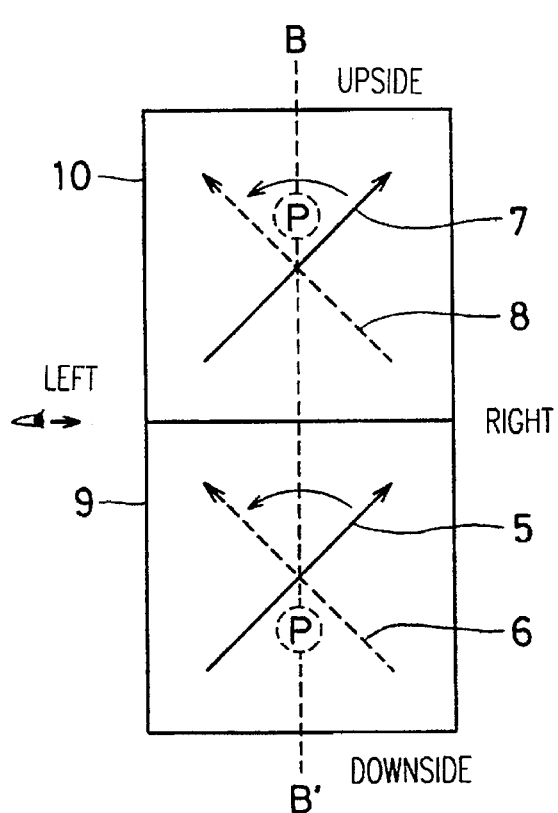
FIG. 2(a)
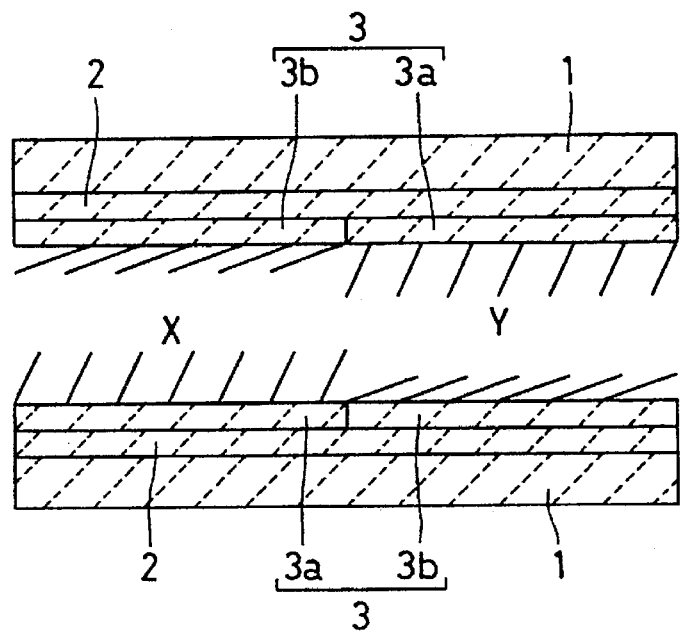
FIG. 2(b)
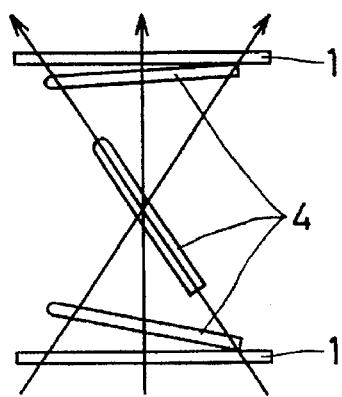
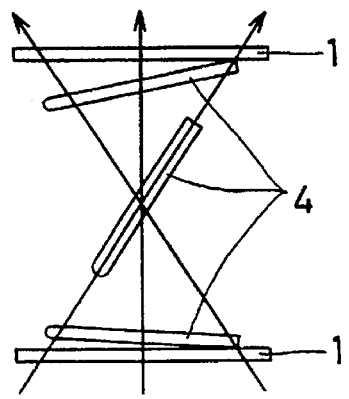

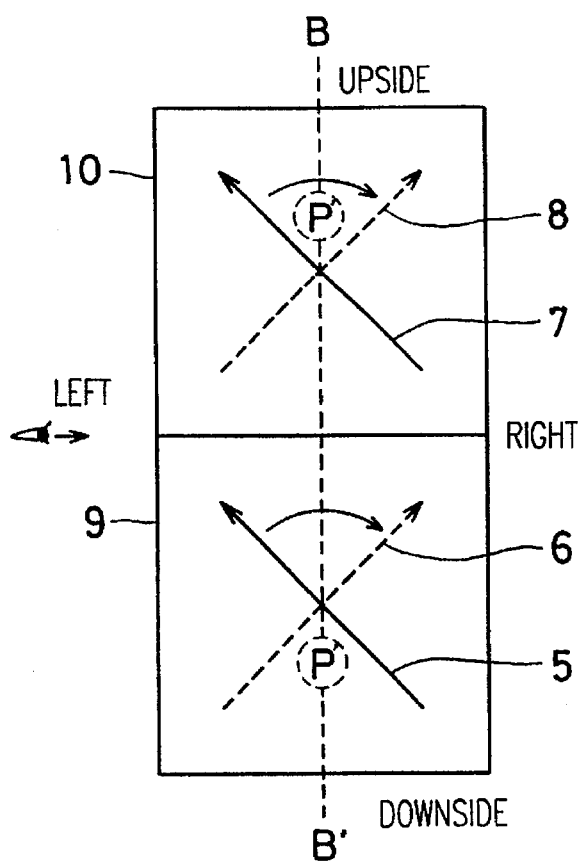
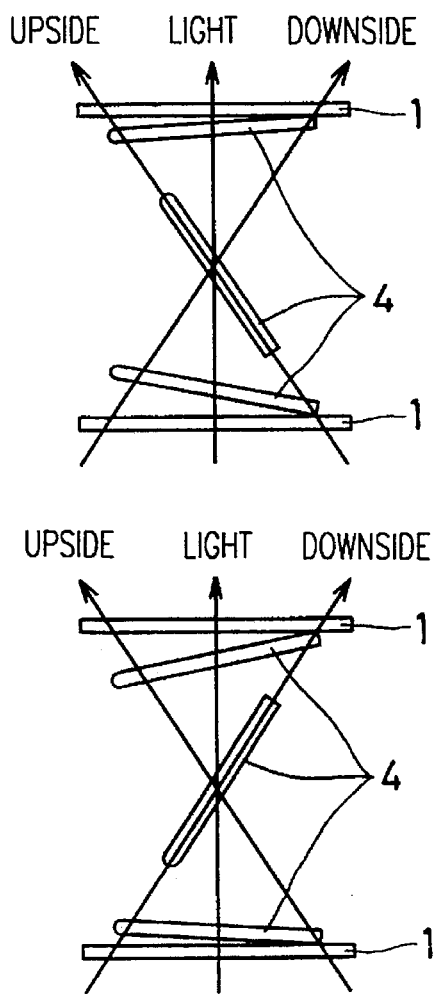

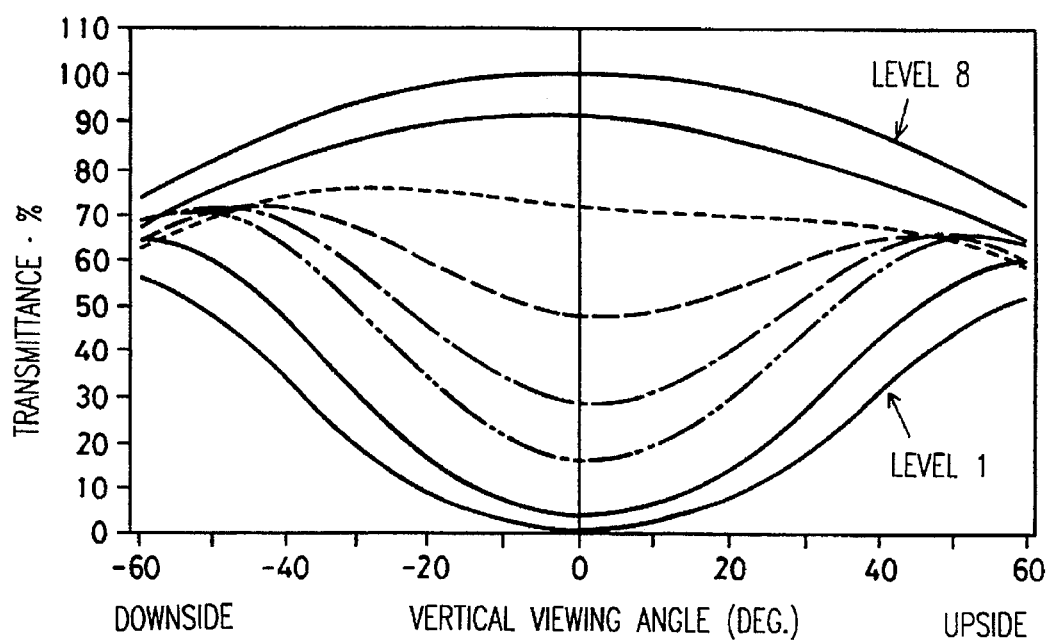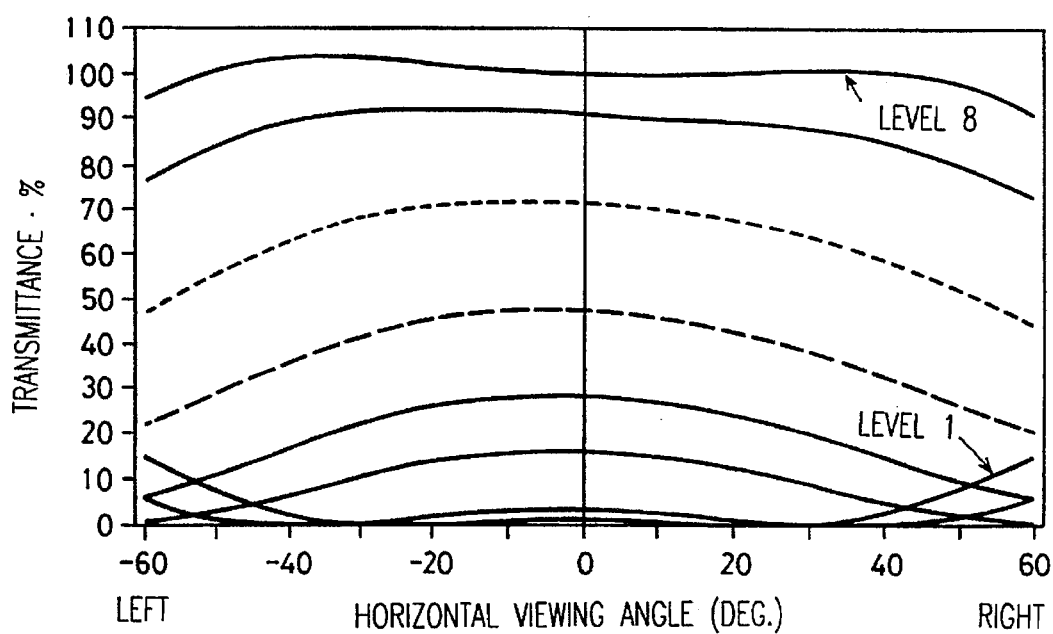

METHOD FOR FABRICATING A LIQUID CRYSTAL DISPLAY INCLUDING IRRADIATING AN ALIGNMENT FILM WITH UV LIGHT

FIELD OF THE INVENTION

The present invention relates to a liquid crystal display device and a method for fabricating the same. More particularly, the invention relates to a liquid crystal display device featuring alignment films of unique construction for orienting liquid crystal molecules in predetermined directions, and a method of making the same.

DESCRIPTION OF THE PRIOR ART

Liquid crystal display devices are generally of such a construction that liquid crystal is interposed between a pair of opposed transparent substrates, with polarizing plates arranged on the exterior side of the pair of transparent substrates. An active matrix type liquid crystal device is of such an arrangement that a common electrode and an alignment film are placed on the interior side of one substrate, while on the interior side of the other substrate there are arranged an active matrix element, a pixel electrode, and an alignment film. For the orientation of liquid crystal molecules, a twisted nematic liquid crystal display device is mentioned as a typical liquid crystal display device. In twisted nematic liquid crystal display devices, where polarized-light transmission axes of the polarizing plates arranged externally of the transparent substrates cross at right angles, the device operates in a normally white mode, while where the polarized-light transmission axes go parallel, the device operates in a normally black mode.

However, twisted nematic liquid crystal display devices involve a problem in respect of luminance characteristics such that the luminance characteristics are dependent upon the angle of field in the case of gray scale. As FIG. 8 illustrates, luminance lines on the liquid crystal panel as viewed in vertical directions intersect with one another in the vicinity of −20° and in the vicinity of +15° resulting in luminance inversion. FIG. 8 shows the relationships by tones between horizontal viewing angle and transmittance in the case of 8-tone display, wherein Level 1 represents black display and Level 8 represents white display. Such luminance inversion poses a problem as a defect in the performance of a display device.

In order to overcome this problem, as FIG. 9 shows, there has been proposed a liquid crystal display device having a glass substrate 31 and a transparent electrode 32, an inorganic alignment film 33 and an organic alignment film 34 which are sequentially superposed on the glass substrate 31, with the organic alignment film 34 being partially cut off. In this liquid crystal display device, the inorganic alignment film 34 acts to maintain liquid crystal at low pretilt angle and the organic alignment film 33 acts to maintain liquid crystal at high pretilt angle. Such alignment film 33 for keeping liquid crystal at low pretilt angle and such alignment film 34 for keeping liquid crystal at high pretilt angle are arranged on upper and lower substrates 31 in such a way that the alignment film 33 portion on each substrate lies opposite the alignment film 34 portion on the other substrate. By such arrangement it is intended that sites for peak luminance are made different in adjacent pixels thereby to enlarge the area of high contrast. That is, where a high-pretilt keeping alignment film 34 and a low-pretilt keeping alignment film 33 are disposed in opposed relation, liquid crystal, when it turns, depends on the pretilt angle of the liquid crystal present in the vicinity of the high-pretilt keeping alignment film 34. As a result, in region X and region Y in FIG. 9, directors of liquid crystal molecules are oriented in opposite directions so that luminance distributions in upward and downward directions are balanced even. Therefore, the area which is not subject to luminance inversion in gray scale is made larger.

This liquid crystal display device of the prior art is fabricated in such a way as illustrated in FIG. 10.

As FIG. 10(a) shows, a transparent electrode 32, an inorganic alignment film 33 for keeping liquid crystal at low pretilt angle, and an organic alignment film 34 for keeping liquid crystal at high pretilt angle are sequentially superposed on a glass substrate 31. Then, as FIG. 10(b) shows, a photoresist 35 is formed by using photolithography or the like technique, and patterning is carried out with respect to the organic alignment film 34. As FIG. 10(c) shows, the organic alignment film 33 and the organic alignment film 34 are simultaneously rubbed with a rubbing cloth 36 for orientation treatment in one direction as indicated by arrow. Finally, as FIG. 9 shows, two glass substrates 31 are arranged in such a way that low-pretilt region 33 and high-pretilt region 34 are disposed in opposed relation, a twisted nematic liquid crystal display device being thus made. In this way, low-pretilt keeping alignment films 33 and high-pretilt keeping alignment films 34 are used in fabricating a liquid crystal display device. This results in improved luminance characteristics in gray scale.

FIG. 11 shows luminance characteristics in gray scale with respect to a liquid crystal panel which uses low-pretilt keeping alignment film 33 and high-pretilt keeping alignment film 34. As is apparent from FIG. 11, there is no crossing of luminance lines within a field angle range of up to about ±40° with no occurrence of luminance inversion within that range.

In fabricating this prior art liquid crystal device, however, it is necessary to form two layers of alignment films, i. e., inorganic alignment film 33 and organic alignment film 34, and also to partially remove the organic alignment film 34 by photolithography so as to cause the inorganic alignment film 33 to be exposed. For the purpose of resist film removal, usually an organic solvent, such as acetone, is used which is likely to damage the organic alignment film 34 which is formed of polyimide or the like, so that normal and orderly molecular orientation may not be achieved. In such fabricating method, the steps of from alignment film forming and up to rubbing are more complex than those conventionally employed. Further, the fact that the resist 35 used in photolithography is of the same organic type as the organic alignment film 34 makes the photolithographic operation very troublesome.

In conventional liquid crystal display devices, the ratio of the natural chiral pitch (p) of liquid crystal to the thickness (d) of the liquid crystal is set at p/d=12–18. Therefore, successive voltage applications to the liquid crystal are likely to be a cause of a display defect known as a "reverse twist domain" in a region in which the liquid crystal is not stably oriented, which in turn results in the trouble of inverted display at irregular sites. In the FIG. 9 liquid crystal display device of the conventional type, as FIG. 12 shows, the direction of rubbing with respect to the alignment films 33, 34 is set for clockwise turn. However, the chiral agent which is added to the liquid crystal 41 for rotating the liquid crystal 41 has some energy for rotating the crystal liquid counterclockwise. Now, directors (longitudinal axes) of liquid crystal molecules 41 which come in contact with the high-pretilt keeping alignment film 34 are oriented in the same direction as that of rubbing with respect to the high-pretilt keeping alignment film 34, and the liquid crystal layer 41, positioned between the substrates 31, rotates on the basis of that orientation while being subjected to the influence of the high pretilt angle. Therefore, the directors (longitudinal axes) of the liquid crystal molecules 41 held in contact with the low-pretilt keeping alignment film 33 on the opposite substrate 31 are always oriented opposite to the direction of rubbing of the alignment film 33. A comparison between the clockwise rotation energy from the rubbing orientation and the counterclockwise rotation energy from the chiral agent tells that if the clockwise rotation energy from the rubbing orientation is more stable, the liquid crystal 41 will turn clockwise, which can be a cause of defective display or reverse twist domain. In this connection it is noted that in FIG. 11, reference numeral 37 designates the direction of rubbing with respect to the high-pretilt keeping alignment film 34 formed on the upper substrate 11, numeral 38 designates the direction of rubbing with respect to the low-pretilt keeping alignment film formed on the lower substrate 11, numeral 39 designates the direction of rubbing with respect to the high-pretilt keeping alignment film 34 on the lower substrate 11, and numeral 40 designates the direction of rubbing with respect to the low-pretilt keeping alignment film 33 on the upper substrate 11.

Therefore, it is an object of the present invention to provide a liquid crystal display device in which a single layer of alignment film has formed therein a region for keeping liquid crystal at high pretilt angle and a region for keeping liquid crystal at low pretilt angle.

It is another object of the invention to provide a method for fabricating a liquid crystal display device which enables formation in a very simple way of an alignment film having a region for keeping liquid crystal at high pretilt angle and a region for keeping liquid crystal at low pretilt angle.

It is a further object of the invention to provide a liquid crystal display device which is not likely to suffer any trouble of defective display or reverse twist domain.

SUMMARY OF THE INVENTION

In order to accomplish the foregoing objects, according to one aspect of the present invention there is provided a liquid crystal display device including transparent electrodes and alignment films placed on opposed surfaces of two glass substrates, with a liquid crystal interposed between the alignment films, the device comprising the alignment films being formed of an organic material, the alignment films having alternately formed on their surfaces a region for keeping liquid crystal at a high pretilt angle and a region for keeping liquid crystal at a low pretilt angle, the respective regions being arranged so that each region in one of the opposed alignment films for keeping liquid crystal at a high pretilt angle lies opposite one region in the other of the opposed alignment films for keeping liquid crystal at a low pretilt angle.

In another aspect of the invention, a method for fabricating a liquid crystal display device is provided which comprises forming on a glass substrate a transparent electrode and an alignment film made of an organic material, subjecting the alignment film to rubbing, then irradiating the alignment film locally with ultraviolet light thereby to form a region for keeping liquid crystal at a high pretilt angle and a region for keeping liquid crystal at a low pretilt angle, bonding two glass substrates to each other so that a region on one of the glass substrates for keeping liquid crystal at a high pretilt angle lies opposite a region on the other of the glass substrates for keeping liquid crystal at a low pretilt angle, and introducing liquid crystal between the two glass substrates.

According to a further aspect of the invention, a method for fabricating a liquid crystal display device is provided which comprises forming on a glass substrate a transparent electrode and an alignment film made of an organic material, irradiating the alignment film locally with ultraviolet light, then subjecting the alignment film to rubbing thereby to form a region for keeping liquid crystal at a high pretilt angle and a region for keeping liquid crystal at a low pretilt angle, bonding two glass substrates to each other so that a region on one of the glass substrates for keeping liquid crystal at a high pretilt angle lies opposite a region on the other of the glass substrates for keeping liquid crystal at a low pretilt angle, and introducing liquid crystal between the two glass substrates.

As described above, a high pretilt region and a low pretilt region are formed in an alignment film comprised of an organic material, whereby improvement in luminance characteristics in gray scale can be attained only with the single layer of alignment film. This results in simplicity in the construction of the liquid crystal display device.

After being subjected to rubbing, the alignment film comprised of an organic material is irradiated locally with ultraviolet light, whereby the portion of the alignment film which is subjected to ultraviolet light irradiation is characteristically changed so that its ability to maintain the liquid crystal in high pretilt condition is reduced. As a result, the region which is not irradiated with ultraviolet light acts to maintain liquid crystal at high pretilt angle, while the region which is subjected to ultraviolet light irradiation acts to maintain liquid crystal at low pretilt angle. Therefore, merely by irradiating the alignment film locally with ultraviolet light, a region for keeping liquid crystal at high pretilt angle and a region for keeping liquid crystal at low pretilt angle can be formed in the alignment film, it being thus possible to provide a liquid crystal display device having improved luminance characteristics in gray scale through such a very simple process.

BRIEF DESCRIPTION OF THE DRAWINGS

These and other objects and features of the present invention will become apparent from the following description taken in conjunction with the preferred embodiment thereof with reference to the accompanying drawings, in which:

FIG. 1 is a sectional view showing one embodiment of a liquid crystal display device in accordance with the present invention;

FIGS. 2a–b show the relationships between directions of rubbing with respect to alignment films and directors of liquid crystal molecules in the liquid crystal display device of the invention;

FIGS. 3a–b show the relationships between directions of rubbing with respect to alignment films arranged in a different way and directors of liquid crystal molecules in the liquid crystal display device of the invention;

FIG. 5a–b is a view illustrating viewing angle characteristics of the liquid crystal display device of the invention, wherein (a) shows vertical viewing angle characteristics and (b) shows horizontal viewing angle characteristics;

DETAILED DESCRIPTION OF THE PREFERRED EMBODIMENTS

Figure 4:
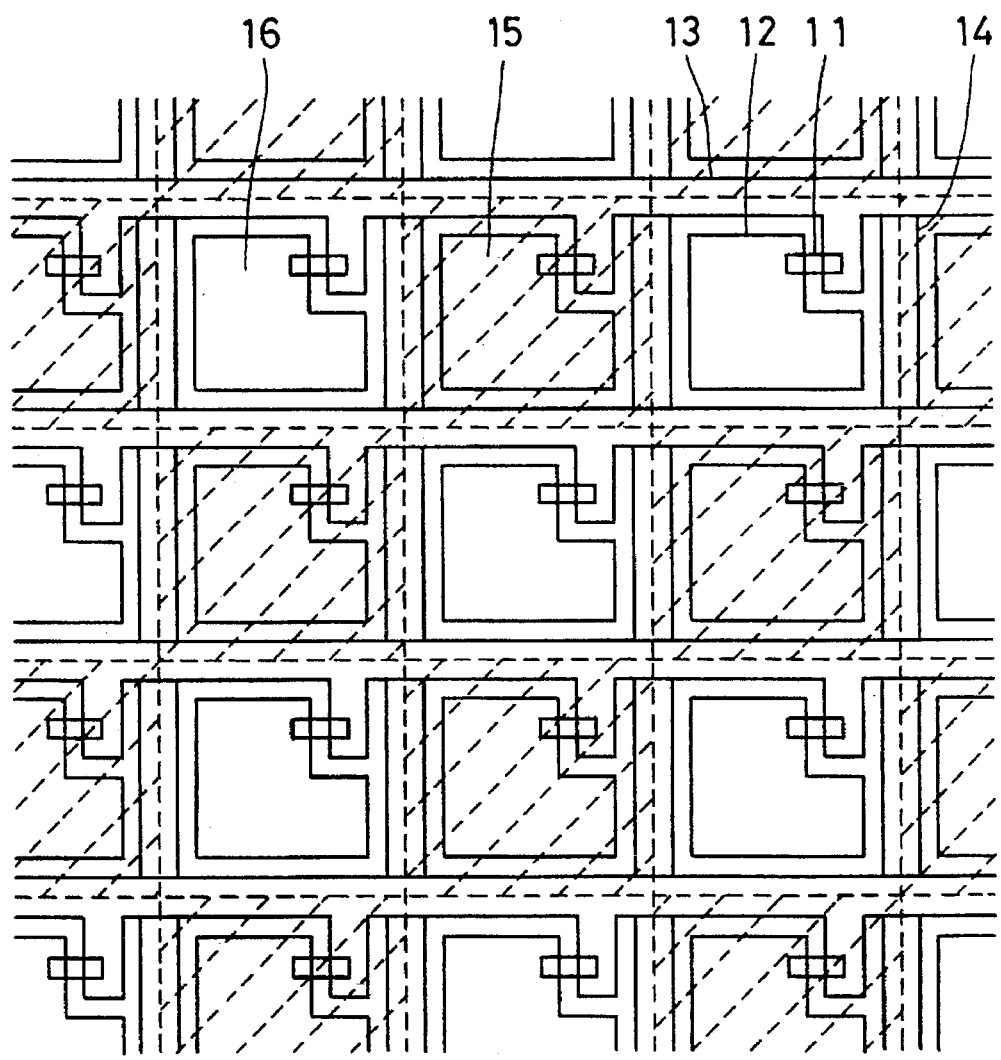
FIG. 4 is a plan view showing one embodiment of the liquid crystal display device of the invention.

Embodiments of the present invention will now be described in detail with reference to the accompanying drawings.

FIG. 1 is a sectional view showing one embodiment of the liquid crystal display device in accordance with the invention, in which numeral 1 designates a glass substrate, 2 designates a transparent electrode, 3 designates an alignment film, and 4 designates a liquid crystal (which components are each arranged in pair). Each of the alignment films 3 is formed of an organic matter composed principally of polyimide, polyamic acid, or the like which can develop a high pretilt formation, and the liquid crystal 4 is comprised of a nematic liquid crystal or the like. Not shown though, the liquid crystal 4 is loaded with Z- twist and/or S- twist chiral agent. Useful as such chiral agents are cholesteric liquid crystal compounds of the steroid type and optically active compounds of the total synthesis type.

Each alignment film 3 has alternately formed therein a region 3a for keeping liquid crystal 4 at high pretilt angle and a region 3b for keeping liquid crystal 4 at low pretilt angle. The alignment films 3 are arranged in such a way that a region 3a in one of the alignment films 3 for keeping liquid crystal at high pretilt angle lies opposite a region 3b in the other of the alignment films 3 for keeping liquid crystal at low pretilt angle. The region 3a for keeping liquid crystal at high pretilt angle and the region 3b for keeping liquid crystal at low pretilt angle may be such that they allow the liquid crystal to assume pretilt angles which are different on the order of 3° to 5°.

FIG. 2 shows directions of rubbing with respect to the alignment films 3 on upper and lower substrates, and the layout relationship between the region 3a for keeping liquid crystal at high pretilt angle and the region 3b for keeping liquid crystal at low pretilt angle. In FIG. 2, the solid line arrow indicates the direction of rubbing with respect to the alignment film 3 on the upper substrate, and the dotted line arrow indicates the direction of rubbing with respect to the alignment film 3 on the lower substrate. Reference numeral 5 designates the direction of rubbing with respect to the high-pretilt keeping region 3a on the upper substrate, 6 designates the direction of rubbing with respect to the low-pretilt keeping region 3b on the lower substrate, 7 designates the direction of rubbing with respect to the low-pretilt keeping region 3b on the upper substrate, and 8 designates the direction of rubbing with respect to the high-pretilt keeping region 3a on the lower substrate. With the alignment films 3 arranged clockwise in this way, liquid crystal molecules 4, loaded with a Z-turn chiral agent, turn leftward on the basis of the directions of rubbing 5, 8 and in the direction of rubbing with respect to the low-pretilt keeping region 3b while being subjected to the influence of the pretilt angle of the high-pretilt keeping region 3a. Therefore, as shown in FIG. 2(b), directors for liquid crystal molecules 4 in a larger part of an intermediate region in the course of rotation are positioned opposite in the relationship between a pixel 9 on the lower side and a pixel 10 on the upper side. More specifically, in the lower pixel 9, the directors of liquid crystal molecules in a larger part of the intermediate region thereof are oriented downward, while in the upper pixel 10, the directors of liquid crystal molecules in a larger part of the intermediate region thereof are oriented upward. Therefore, respective luminance peaks of the pixels 9, 10 are covered by regions represented by P in FIG. 2(a), that is, luminance peaks of adjacent pixels are oriented in opposite directions. Thus, the dependence of luminance upon viewing angle at the one pixel is balanced by that at the other pixel, so that there develops a wider region which is not subject to luminance inversion in gray scale.

FIG. 3 shows the layout relationship between the high-pretilt keeping region 3a and the low-pretilt keeping region 3b in the case where the alignment films 3 are arranged in a different way. As FIG. 3 shows, when the alignment films 3 are arranged counterclockwise, liquid crystal molecules 4, loaded with an S-turn chiral agent, turn rightward on the basis of the directions of rubbing 5, 8 and in the direction of rubbing with respect to the low-pretilt keeping region 3b while being subjected to the influence of the pretilt angle of the high-pretilt keeping region 3a. Therefore, as shown in FIG. 3(b), directors for liquid crystal molecules 4 in a larger part of an intermediate region in the course of rotation are positioned opposite in the relationship between a pixel 9 on the lower side and a pixel 10 on the upper side. More specifically, in the lower pixel 9, the directors of liquid crystal molecules in a larger part of the intermediate region thereof are oriented downward, while in the upper pixel 10, the directors for liquid crystal molecules in a larger part of the intermediate region thereof are oriented upward. Therefore, respective luminance peaks of the pixels 9, 10 are covered by regions represented by P' as shown. Thus, as is the case with the FIG. 2 liquid crystal display device, luminance peaks of adjacent pixels are offset against each other, so that there develops a wider region which is not subject to luminance inversion in gray scale.

FIG. 4 shows by way of example an active matrix board in which alignment films 3 of the above described type are used. In FIG. 4, reference numeral 11 designates a thin film transistor (TFT) for controlling voltage application to a pixel electrode 12, numeral 13 designates a source line for feeding an image signal to the pixel electrode 12 via the thin film transistor 11, and numeral 14 designates a gate line for supplying a scan signal to the thin film transistor 11. As FIG. 4 shows, the active matrix board has a plurality of regions defined by centerlines of source lines 13 and those of gate lines 14, including high-pretilt regions 15 represented by shaded portions and low- pretilt regions 16 represented by non-shaded portions, the high-pretilt and low-pretilt regions 15, 16 being alternately arranged in corresponding relation to the arrangement of pixels. On an opposite board are arranged similar high-tilt and low-tilt regions in such a way that a low-pretilt region lies opposite a high-pretilt region on the active matrix board and a high-pretilt region lies opposite a low-pretilt region on the active matrix board.

The ratio of the natural chiral pitch (p) of the liquid crystal 4 interposed between two glass substrates 1 to the thickness (d) of the liquid crystal 4 is preferably set within the range of p/d=2–10. If p/d is lower than 2, the liquid crystal will have an operation mode different from that of a twist nematic liquid crystal, with the result that such light transmission and light screening control as is inherently achievable by the twist nematic liquid crystal mode is rendered impossible due to some potential difference. If p/d is greater than 10, the liquid crystal 4 tends to turn in the direction in which its turning is regulated by the rubbing of the alignment film 3, with the result that luminance peaks in gray scale appear in adjacent pixels at identical positions. As such, no improvement could be achieved in viewing angle characteristics with respect to luminance in gray scale.

With a liquid crystal panel having an alignment film 3 in which high- pretilt regions 3a and low-pretilt regions 3b are formed in the above described manner and in which p/d is set in the range of 2–10 (UV light intensity, 100 mW/cm²× 300 sec; natural chiral pitch, 15.7 μm; liquid crystal layer thickness, 5 μm), vertical viewing angle characteristics and horizontal viewing angle characteristics are shown in FIG. 5. As is apparent from FIG. 5(a), non-inverted tone areas in gray scale as viewed in vertical directions are considerably large on the order of −40° to 40°. Similarly, as is clearly seen from FIG. 5(b), non-inverted tone areas in gray scale as laterally viewed are also of the order of −40° to 40°. In FIG. 5, Level 1 signifies black display and Level 8 signifies white display. That is, viewing angle characteristics are shown in the case of 8-tone display.

Next, a method for fabricating a liquid crystal display device in accordance with the invention will be explained with reference to FIG. 6.

Figure 6A:
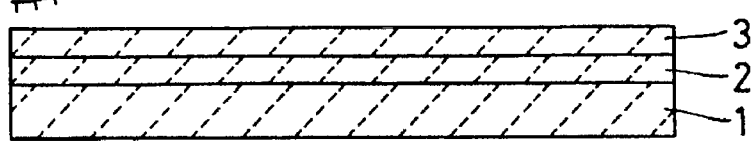
FIGS. 6a–c illustrate the process for fabricating the liquid crystal display device of the invention.
Figure 6B:
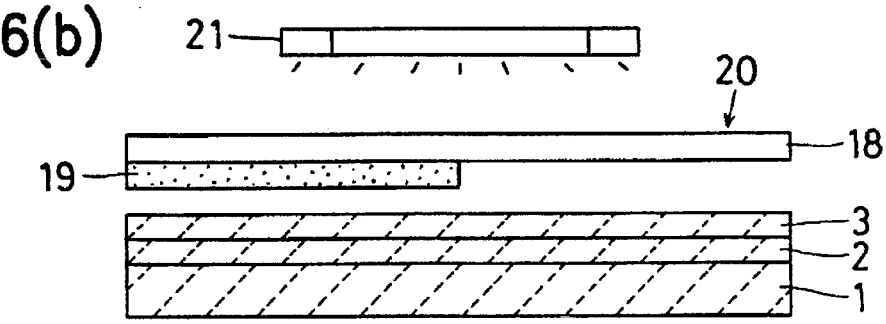
Figure 6C:
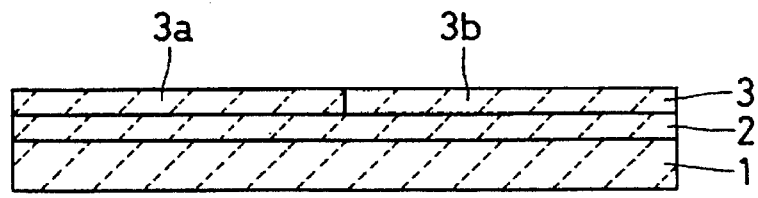

First, as FIG. 6(a) shows, an alignment film 3 of an organic matter which can develop high pretilt condition is formed on a glass substrate 1 formed with a transparent electrode 2. Using a rubbing cloth 17 which is woven from a man-made fiber, such as rayon, electroconductive rayon, or nylon, or natural fiber, such as cotton, or made by implanting a base cloth with such fiber material, rubbing is effected in one direction as shown by arrow in the figure for orientation treatment. Then, as FIG. 6(b) shows, a mask substrate 20 comprising a UV light permeable glass 18, such as silica glass, patterned with a metal thin film or organic thin film 19 capable of reflecting and absorbing UV light is positioned to register with the glass substrate 1 for a liquid crystal panel, which is then subjected to ultraviolet light irradiation from a UV light source 21 for a predetermined time. As a result, as FIG. 6(c) shows, a region 3b which is irradiated with ultraviolet light through the mask substrate 20 changes from the high-pretilt condition to a low-pretilt condition, which a region 3a which is not irradiated with ultraviolet light maintains its initial high-pretilt condition. For the ultraviolet light irradiation, a UV light of 150–350 nm in wavelength which is called "vacuum UV light" is used, for example.

Figure 7:
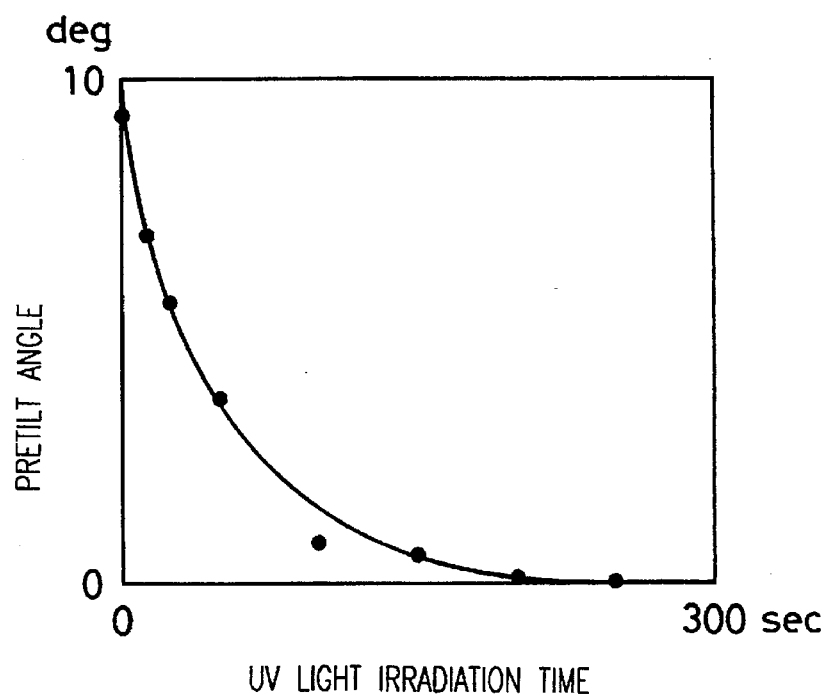
FIG. 7 is a view showing the relationship between time for ultraviolet light illumination applied to the alignment films of the liquid crystal display device of the invention and pretilt angle.
Figure 8:
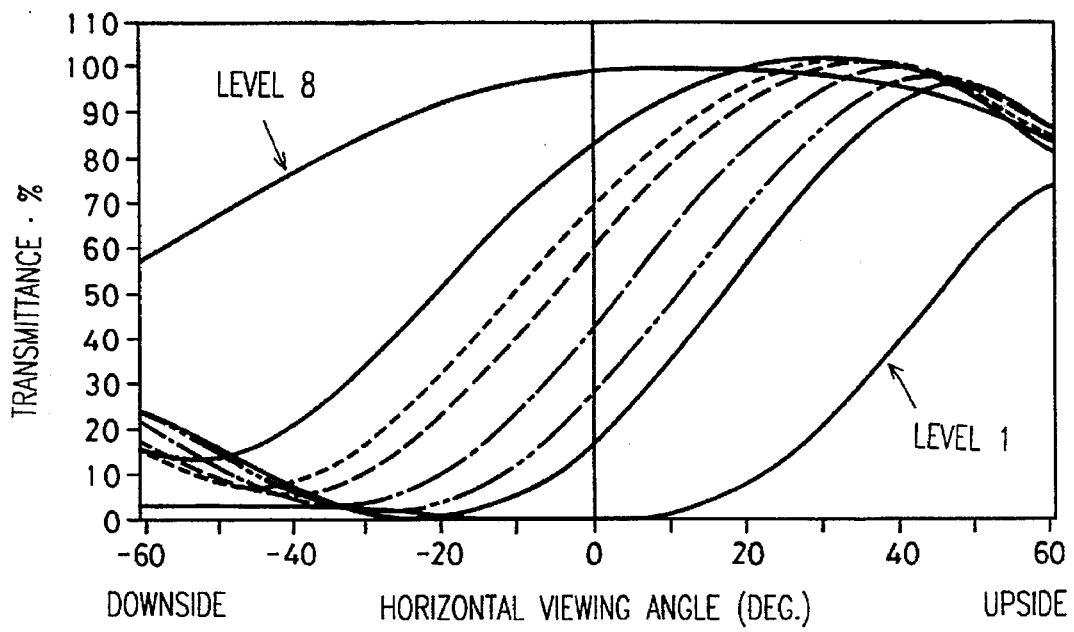
FIG. 8 is a view showing viewing angle characteristics of a conventional liquid crystal display device.
Figure 9:
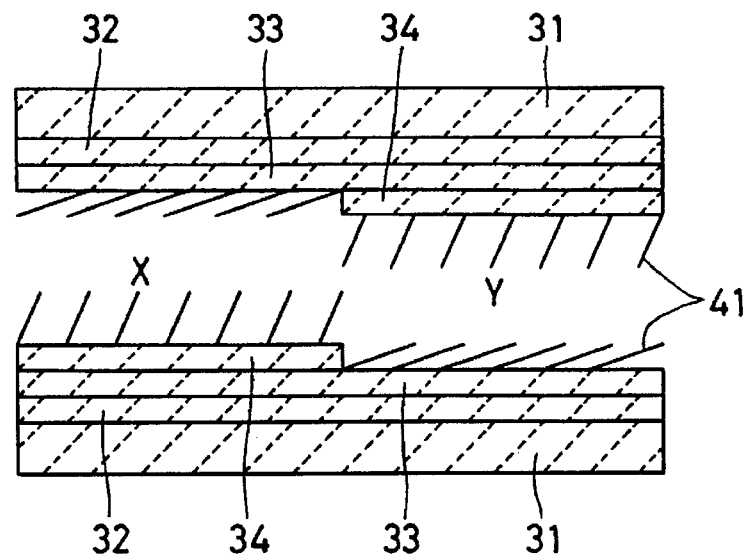
FIG. 9 is a sectional view showing the arrangement of the conventional liquid crystal display device.
Figure 10A:
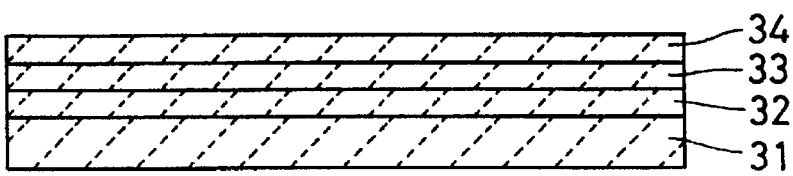
FIGS. 10a–c illustrate a fabricating process for the conventional liquid crystal display device.
Figure 10B:
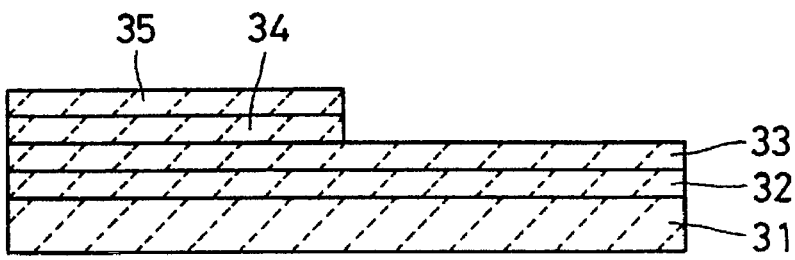
Figure 10C:
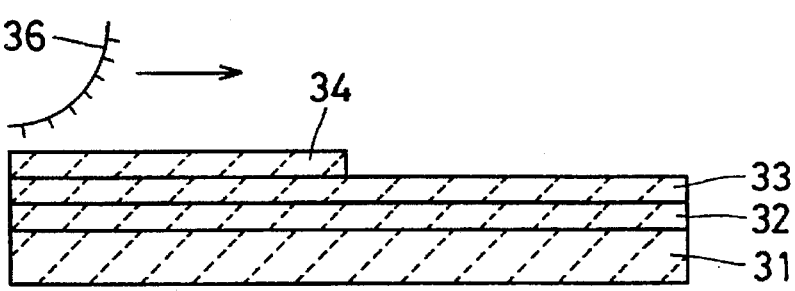
Figure 11:
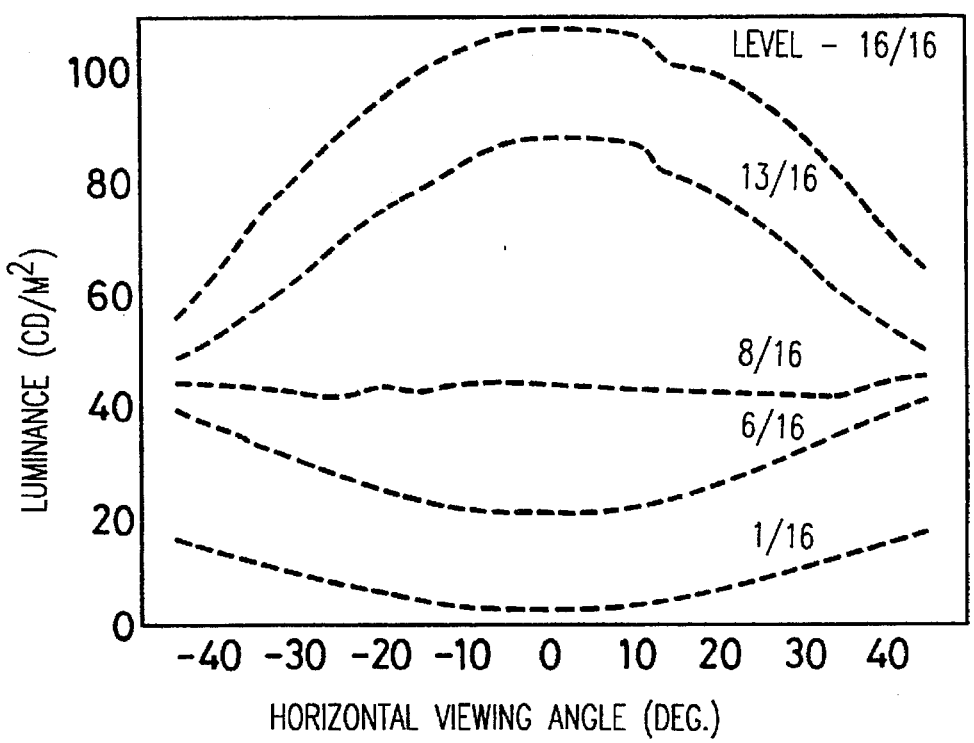
FIG. 11 is a view showing viewing angle characteristics with respect to another liquid crystal display device of the prior art.
Figure 12:
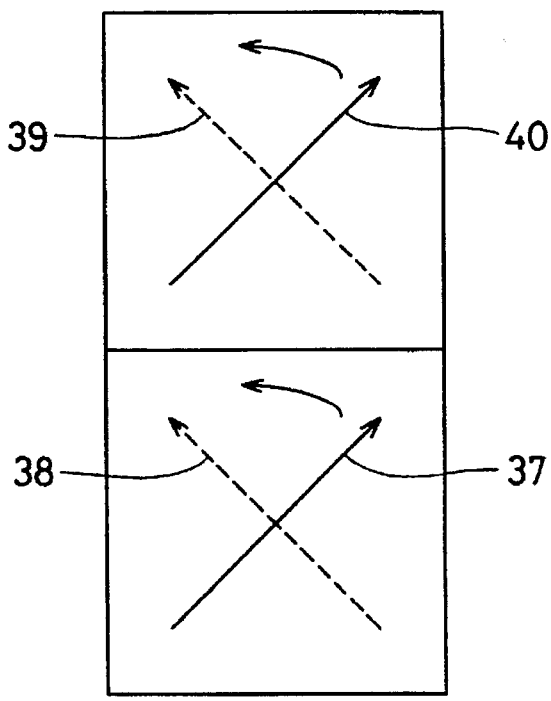
FIG. 12 is a view showing directions of rubbing for another liquid crystal display device of the prior art.

FIG. 7 shows the relationship between time for UV light irradiation toward the alignment film 3 and pretilt angle with respect to liquid crystal molecules in the case of the alignment film being used. It is noted that the measurements in FIG. 7 are based on a test in which alignment films 3 formed of a polyimide resin and rubbed under a force (RS) of 34 mm were subjected to UV light irradiation with an illuminance of 100 mW/cm². As is apparent from FIG. 7, alignment films 3 which were rubbed but not irradiated with UV light (irradiation time 0) had a pretilt angle of 9° but when irradiated with UV light for 150 seconds, the pretilt angle was reduced to 1°, and after 200 second irradiation, the pretilt angle was reduced to zero. This shows that where an alignment film 3 is irradiated locally with ultraviolet light by using a mask substrate 20 as shown in FIG. 6(b), there can be formed a high-pretilt region and a low-pretilt region. Where the integral quantity of UV light is less than 1000 mJ/cm², it is not possible to cause liquid crystal to have a pretilt angle difference of 3° or more. Therefore, the integral quantity of UV light must be 1000 mJ/cm² or more.

In the above described embodiment, after alignment films 3 are rubbed, ultraviolet light was locally irradiated. As an alternative, the step of rubbing shown in FIG. 6(a) and the step of UV light irradiation shown in FIG. 6(b) may be sequentially reversed so that the alignment film 3 is irradiated locally with UV light before it is subjected to rubbing. Where the alignment film 3 is irradiated with UV light prior to rubbing in this way, partial change is caused to the region 3b of the alignment film 3 which is subjected to UV light irradiation, so that subsequent rubbing does not allow the region 3b to maintain a high pretilt condition. Thus, the region 3b which is irradiated with UV light and the region 3a which is not irradiated with UV light are allowed to have different pretilt angles. Accordingly, it is possible to obtain a display device that is even in quality with the earlier described embodiment. When the alignment film 3 is subjected to UV light irradiation prior to the step of rubbing, such irradiation can be effected while the mask is held in contact with the alignment film 3. This provides for improvement in mask positioning accuracy relative to the alignment film 3, as well as in dimensional accuracy with respect to the region subjected to UV light irradiation.

As described hereinabove, the liquid crystal display device according to the present invention comprises the alignment films being formed of an organic material, the alignment films having alternately formed on their surfaces a region for keeping liquid crystal at a high pretilt angle and a region for keeping liquid crystal at a low pretilt angle, the respective regions being arranged so that each region in one of the opposed alignment films for keeping liquid crystal at a high pretilt angle lies opposite each region in the other of the opposed alignment films for keeping liquid crystal at a low pretilt angle. This makes it possible to provide a liquid crystal display device having improved luminance characteristics in gray scale.

According to the method for fabricating a liquid crystal display device in accordance with the invention, a transparent electrode and an alignment film made of an organic material are formed on a glass substrate, the alignment film being then subjected to rubbing, and thereafter the alignment film is irradiated locally with ultraviolet light thereby to be formed with a region for keeping liquid crystal at a high pretilt angle and a region for keeping liquid crystal at a low pretilt angle. Therefore, that portion of the alignment film which is subjected to ultraviolet light irradiation acts to maintain liquid crystal at low pretilt angle. It is thus possible to form the region for keeping liquid crystal at high pretilt angle and the region for keeping liquid crystal at low pretilt angle in the alignment film in a very simple way. This provides for great simplicity in the fabrication process.

Another method for fabricating a liquid crystal display device in accordance with the invention comprises forming on a glass substrate a transparent electrode and an alignment film made of an organic material, irradiating the alignment film locally with ultraviolet light, then subjecting the alignment film to rubbing thereby to form a region for keeping liquid crystal at a high pretilt angle and a region for keeping liquid crystal at a low pretilt angle in the alignment film. This permits operation to be performed while the masked substrate which is subject to ultraviolet light irradiation is held in contact with the alignment film, and thus provides for improved efficiency in UV light irradiating operation and easy formation of the two regions to close precision limits.

Although the present invention has been fully described by way of example with reference to the accompanying drawings, it is to be noted here that various changes and modifications will be apparent to those skilled in the art. Therefore, unless otherwise such changes and modifications depart from the scope of the present invention as defined by the appended claims, they should be construed as included therein.

What is claimed is:

1. A method for fabricating a liquid crystal display device, comprising:

forming on a first glass substrate a first transparent electrode and a first alignment film comprising an organic material, subjecting the first alignment film to rubbing, locally irradiating the first alignment film with ultraviolet light after subjecting the first alignment film to rubbing to thereby form a region for keeping liquid crystal at a high pretilt angle and a region for keeping liquid crystal at a low pretilt angle, forming on a second glass substrate a second transparent electrode and a second alignment film comprising an organic material, subjecting the second alignment film to rubbing, locally irradiating the second alignment film with ultraviolet light after subjecting the second alignment film to rubbing to thereby form a region for keeping liquid crystal at a high pretilt angle and a region for keeping liquid crystal at a low pretilt angle, bonding the first substrate to a second glass substrate having a region for keeping liquid crystal at a high pretilt angle and a region for keeping liquid crystal at a low pretilt angle, the first and second substrates being arranged so that the region for keeping liquid crystal at a high pretilt angle of the first substrate is substantially opposite the region for keeping liquid crystal at a low pretilt angle of the second substrate, and introducing liquid crystal between the first and second substrates, wherein the ultraviolet light defines an integral quantity of light not lower than 1000 mJ/cm$^2$.

2. A method for fabricating a liquid crystal display device, comprising:

forming on a first glass substrate a first transparent electrode and a first alignment film comprising an organic material, locally irradiating the first alignment film with ultraviolet light, subjecting the first alignment film to rubbing after locally irradiating the first alignment film with ultraviolet light to thereby form a region for keeping liquid crystal at a high pretilt angle and a region for keeping liquid crystal at a low pretilt angle, forming on a second glass substrate a second transparent electrode and a second alignment film comprising an organic material, subjecting the second alignment film to rubbing, locally irradiating the second alignment film with ultraviolet light after subjecting the second alignment film to rubbing to thereby form a region for keeping liquid crystal at a high pretilt angle and a region for keeping liquid crystal at a low pretilt angle, bonding the first substrate to a second glass substrate having a region for keeping liquid crystal at a high pretilt angle and a region for keeping liquid crystal at a low pretilt angle, the first and second substrates being arranged so that the region for keeping liquid crystal at a high pretilt angle of the first substrate is substantially opposite the region for keeping liquid crystal at a low pretilt angle of the second substrate, and introducing liquid crystal between the first and second substrates, wherein the ultraviolet light defines an integral quantity of light not lower than 1000 mJ/cm$^2$.

* * * * *